United States Patent
Sumita et al.

(10) Patent No.: US 6,777,100 B2
(45) Date of Patent: Aug. 17, 2004

(54) SURFACE PROTECTIVE FILM FOR ADHESIVE RESIN AND PROCESS FOR PRODUCING THE SAME

(75) Inventors: Katsuhiko Sumita, Himeji (JP); Masaya Omura, Himeji (JP)

(73) Assignee: Daicel Chemical Industries, Ltd., Sakai (JP)

( * ) Notice: Subject to any disclaimer, the term of this patent is extended or adjusted under 35 U.S.C. 154(b) by 0 days.

(21) Appl. No.: 10/439,320

(22) Filed: May 16, 2003

(65) Prior Publication Data

US 2003/0232165 A1 Dec. 18, 2003

(30) Foreign Application Priority Data

Jun. 12, 2002 (JP) .......................................... 2002-170975
Apr. 4, 2003 (JP) .......................................... 2003-101356

(51) Int. Cl.$^7$ .......................... B32B 7/06; B32B 23/00; B32B 23/08; B32B 33/00
(52) U.S. Cl. ...................... 428/481; 428/41.8; 428/532; 428/213; 428/215; 427/339; 427/384
(58) Field of Search ................................. 428/41.8, 481, 428/532, 213, 215; 427/339, 384

(56) References Cited

U.S. PATENT DOCUMENTS

| | | | | | |
|---|---|---|---|---|---|
| 3,978,274 | A | * | 8/1976 | Blum | 428/476.3 |
| 6,630,531 | B1 | * | 10/2003 | Khandpur et al. | 524/505 |
| 2002/0081400 | A1 | * | 6/2002 | Gocho et al. | 428/29 |

* cited by examiner

*Primary Examiner*—Vivian Chen
(74) *Attorney, Agent, or Firm*—Armstrong, Kratz, Quintos, Hanson & Brooks, LLP

(57) ABSTRACT

A surface protective film which can be easily peeled off from an adhesive resin layer it protects, is free of any component which may have an adverse effect on adhesion of the adhesive resin layer to an object to which it is bonded, and has no adverse effect on thickness uniformity or surface flatness of the adhesive resin layer, and a process for producing the same. More specifically, a surface protective film for protecting an adhesive resin layer, comprising a base film (A) coated, at least on one side, with a cellulose-based resin layer (B) having an SP value of 21.0 to 29.0$(MPa)^{1/2}$, determined by the Fedors method, and process for producing the same.

7 Claims, No Drawings

SURFACE PROTECTIVE FILM FOR ADHESIVE RESIN AND PROCESS FOR PRODUCING THE SAME

BACKGROUND OF THE INVENTION

1. Field of the Invention

The present invention relates to a surface protective film for adhesive resin and process for producing the same, more particularly a surface protective film which can be easily peeled off from an adhesive resin film surface to which it is applied, free of a plasticizer or the like, which may have an adverse effect on adhesion of the adhesive resin itself, and having no adverse effect on thickness uniformity or surface flatness of the adhesive resin, and process for producing the same.

2. Description of the Prior Art

There are many types of adhesive resin, from low to high viscosity type. Considering adhesive agents, which are one of the representative applications of adhesive resin, the low-viscosity type is directly spread from a can, bottle, tube or the like onto an adhesion interface whereas the high-viscosity type is used as a hot melt after being heated, or as the so-called adhesive tape, where it is used while being supported by a base film.

Layered (sometimes referred to as sheet-shape) adhesive agents have been increasingly used with development of technology. A layered (sheet-shape) adhesive agent of hot melt type may be used as a product after being merely sprayed with a blocking inhibitor (inorganic powder of silica gel, zeolite, calcium carbide or the like) or laminated with a releasing paper put between the sheets, because the sheets are relatively not sticky to each other at room temperature. However, a layer (or sheet) of an adhesive agent viscous at room temperature is sticky to each other or another object around before it is applied to an intended object, and may not be saleable. As such, it is necessarily coated with a releasable surface protective film temporarily before being sold.

Therefore, when a layered (sheet-shape) adhesive agent of the above type is applied to an object, a releasable (temporarily adhesive) surface protective film is peeled off from the agent-containing laminate brought close to the object, and the exposed agent is quickly transferred to and bonded to the object. The resulting laminate is then pressed and/or heated, as required, to fast bond the adhesive to the object.

Layered (sheet-shape) adhesive agents are widely used in various industrial areas, e.g., electronic, medical, printing, machinery, optical device, ornament, jewelry, information device and clothing industries.

The adhesive resin layer with the surface kept exposed will be contaminated with dust, moisture or the like in air, which will degrade the object to which it is bonded. Therefore, it should be coated with a surface protective layer to be protected against such contaminants.

The surface protective films proposed so far include those of fluorine, polyethylene, polypropylene, polyimide, polyester, polyether, polyether sulfone, epoxy and phenol resin.

However, the surface protective films of these resins involve various problems, as described below.

For example, a fluorine-based film, although good in releasability, involves a problem of reduced adhesive strength of the adhesive resin layer to the object from which it is peeled off.

Each of a polyethylene and polypropylene resin sheet (synonymous with "film," "layer" or the like), although low in cost, has a melting point lower than crosslinking temperature of the adhesive resin to cause a problem of deformed surface protective film itself with the result that the adhesive resin layer of constant thickness may be no longer formed.

A polyimide resin sheet, although very high in heat resistance and dimensional stability, involves problems of high cost and slightly low releasability from the adhesive resin layer.

A polyester resin sheet, represented by polyethyleneterephthalate (PET) sheet, although favorable in that it is free of fisheye or uneven thickness, involves a problem of poor releasability.

A polyether resin sheet involves problems of insufficient surface flatness, high cost and very poor releasability from the adhesive resin layer.

A polyether sulfone (sometimes referred to as PES) resin sheet has been used as a surface protective film most widely, because of its good releasability from the adhesive resin layer, but involves problems of high cost and possibly causing fisheye and uneven thickness to increase defective product yield.

An epoxy resin sheet is not used, because of its very poor releasability from the adhesive resin layer. A phenol resin sheet is also not used, because of its very poor flexibility.

The common releasing film (separator) is difficult to use as the surface protective film, because it is surface-treated with silicone for releasability, which causes problems similar to those associated with a fluorine-based film.

An adhesive resin layer, when heated at relatively high temperature for extended periods following the conventional procedure to improve its adhesive strength with an object, can deteriorate performance of the object to which it is to be bonded, because of high temperature to which the object is exposed. Therefore, an adhesive resin layer tends to be incorporated with an adhesion promoter. However, use of an adhesion promoter may cause problems of deteriorated releasability of the conventional surface protective film from the adhesive resin layer to obstruct the releasing works, and uneven thickness of the adhesive resin layer left by the surface protective film. These problems may cause difficulty in producing the product of high reliability.

Layered (sheet-shape) adhesive agents of various adhesive resins are widely used in various industrial areas, e.g., electronic device, medical, printing, machinery, optical device, ornament, jewelry, information device and clothing industries. Quality of the layered (sheet-shape) adhesive agent required by each area varies depending on the resin material and industrial area in which it is used. The common requirements in these areas are that the agent should not cause quality degradation resulting from transfer of plasticizer, oligomer, low-molecular-weight compound, solvent or the like from the surface protective layer, and that flatness of the adhesive agent surface and uniform thickness of the agent layer should not be prevented.

SUMMARY OF THE INVENTION

In consideration of the problems involved in the conventional techniques, it is an object of the present invention to provide a surface protective film for adhesive resin which can be easily peeled off from the resin surface to which it is applied, is free of a plasticizer or the like which may have an adverse effect on adhesion of the adhesive resin itself, and has no adverse effect on thickness uniformity or surface flatness of the adhesive resin.

The inventors of the present invention have found, after having made on a trial basis a variety of types of plastic films and plastic film laminates, and extensively conducted a number of tests to investigate releasability of the plastic films from an adhesive resin layer, and their effects on adhesion of the adhesive resin layer to the object to which it is applied and on thickness uniformity of the adhesive resin layer and its surface flatness, that a surface protective film comprising a base film coated, at least on one side, with a cellulose-based resin layer having a specific SP value (Solubility Parameter; determined by the Fedors method) gives good results, achieving the present invention.

The first aspect of the present invention provides a surface protective film for adhesive resin, comprising a base film (A) coated, at least on one side, with a cellulose-based resin layer (B) having an SP value of 21.0 to 29.0$(MPa)^{1/2}$, determined by the Fedors method.

The second aspect of the present invention provides the surface protective film of the first aspect, wherein the cellulose-based resin layer (B) is of cellulose acetate having an acetylation degree of 47 to 63.

The third aspect of the present invention provides the surface protective film of the first aspect, wherein the base film (A) is a polyethyleneterephthalate film, and the base film (A) and cellulose-based resin layer (B) are laminated at an adhesive strength of 200N/m or more.

The fourth aspect of the present invention provides the surface protective film of the first aspect, wherein the cellulose-based resin layer (B) contains a residual organic solvent at 100 ppm or less.

The fifth aspect of the present invention provides the surface protective film of the first aspect, wherein the base film (A) is 20 to 200 $\mu$m thick and cellulose-based resin layer (B) is 1 to 10 $\mu$m thick.

The sixth aspect of the present invention provides the surface protective film of the first aspect, wherein the surface protective film and resin surface to which it is applied are bonded to each other at a peel strength of 5N/m or less.

The seventh aspect of the present invention provides a process for producing the surface protective film of one of the first to sixth aspects, wherein a dope of cellulose-based resin is spread and dried at least on one side of the base film (A) to form the cellulose-based resin layer (B) thereon.

DETAILED DESCRIPTION OF THE INVENTION

The surface protective film of the present invention is described for each item.
1. Base Film (A)

The base film (A) for the present invention is the film serving as the base for the surface protective film of the present invention. It is responsible for mechanical strength of the surface protective film, and is coated, at least on one side, with a cellulose-based resin layer (B) having an SP value (Solubility Parameter) of 21.0 to 29.0$(MPa)^{1/2}$, determined by the Fedors method.

The materials useful for the base film (A) include polyethyleneterephthalate, polybutylene terephthalate, polyethylene naphthalate, polybutylene naphthalate, polycarbonate, high-density polyethylene, straight-chain, low-density polyethylene, polypropylene, poly-4-methylpentene-1, polystyrene, polysulfone, polyether sulfone (PES), polyphenylene sulfide, poly-p-phenyleneterephthalamide, polyamide, polyetheretherketone, polyarylate, polyphenylene ether, polyphenylene oxide, polyacetal, methyl polymethacrylate, polyacrylonitrile, polychlorotrifluoroethylene, polytetrafluoroethylene, polyparaxylene, polyetherimide, polyimide, vinyl polychloride, polyurethane and epoxy resin for films (sheets).

Of these resin films, the most preferable one is a polyethyleneterephthalate film for various reasons, e.g., moderate cost, being free of problems associated with fisheye and uneven thickness, high toughness to secure good handleability, high adhesion to the cellulose acetate layer (B1), and high adhesion strength of 200N/m or more at which it can be laminated on the resin layer (B).

When the adhesive strength is below 200N/m and lower than peel strength for separating the surface protective film from the adhesive resin layer surface, the object of the present invention cannot be achieved, because the base film (A) is separated from the cellulose-based resin layer (B) before the surface protective film is peeled off from the adhesive resin layer.

These resins may be used either individually or in combination.

Acetylation degree and substitution degree satisfy the following relationship:

Resin film thickness is 20 to 200 $\mu$m, preferably 30 to 150 $\mu$m, more preferably 40 to 100 $\mu$m. At below 20 $\mu$m, it may be insufficient in toughness to deteriorate its handleability. On the other hand, thickness of above 200 $\mu$m is undesirable, because it may be excessively tough and difficult to be rolled, and the material cost will run up to push up the cost, because of quality runaway.

The base film (A) may be incorporated, as required, with an additive, e.g., anti-oxidant, thermal stabilizer, lubricant, pigment or UV protective agent.

Moreover, it may be treated by, e.g., corona discharge or undercoating, to improve adhesion of the interface with the cellulose-based resin layer (B).
2. Cellulose-Based Resin Layer (B)

The cellulose-based resin layer (B) for the present invention serves as the interface with the adhesive resin layer to which it is applied. As such, it is necessary for the layer (B) to be easily peeled off from the adhesive resin layer, and free of any component which may have an adverse effect on adhesion of the adhesive resin layer to the object to which it is bonded.

For the interface to have good releasability, the cellulose-based resin layer (B) should have an SP value of 21.0 to 29.0$(MPa)^{1/2}$, determined by the Fedors method. The interface may not be smoothly peeled off from the adhesive resin layer when it is below 21.0 $(MPa)^{1/2}$, and the cellulose-based resin layer (B) may be difficult to produce when it is above 29.0$(MPa)^{1/2}$.

The cellulose-based resins (B) having an SP value in the above range include carboxymethyl cellulose, carboxyethyl cellulose, hydroxymethyl cellulose, hydroxyethylmethyl cellulose, hydroxypropylmethyl cellulose, hydroxyethyl cellulose, nitrocellulose, cellulose tricarbanilate, cellulose tributyrate, cellulose tribenzoate, cellulose trivalerate, cellulose xanthogenate, cellulose sulfate, cellulose acetate, cellulose acetopropionate, cellulose acetobutyrate, cellulose trifluoroacetate, tosyl cellulose, cellulose phosphate and cyanoethyl cellulose.
2.1 Cellulose Acetate Layer Cellulose acetate is a semi-synthetic polymer with 3 hydroxyl groups esterified by acetyl groups on the glucose ring which constitutes the cellulose molecular skeleton, to substitute the hydrogen atom in the hydroxyl group by acetyl group.

Degree of substitution means number of hydrogen atoms in the 3 hydroxyl groups substituted by acetyl group. For example, substitution degree of 3 means all of 3 hydroxyl groups being substituted, and substitution degree of 2 means 2 hydroxyl groups being substituted to leave one hydroxyl group unsubstituted.

Acetylation degree (%) is percentage by weight of the introduced acetyl group substituted by acetic acid.

Substitution degree=Acetylation degree×3.86/142.9−Acetylation degree

According to the above relationship, acetylation degrees of 47, 55, 61 and 63% correspond to substitution degrees of 1.9, 2.4, 2.9 and 3.0, respectively.

Cellulose acetate has properties greatly changing with substitution degree. In the present invention, cellulose acetate having a substitution degree of 47 to 63% is used.

Cellulose acetate having a substitution degree below 47% may cause problems, e.g., difficulty in separating the surface protective film from the adhesive resin layer because of increased peel strength from the layer, and difficulty in making the dope (high-viscosity solution of cellulose acetate in a solvent at a high nonvolatiles content of around 5 to 15%) because of decreased solubility in the solvent. On the other hand, cellulose acetate having a substitution degree above 63% may be difficult to produce.

When the surface protective film of the present invention is comprises a base film of polyethyleneterephthalate and cellulose acetate layer, it is necessary for the cellulose acetate layer is laminated on the polyethyleneterephthalate film at an adhesive strength of 200N/m or more, and cannot be peeled off from the film at a lower strength. On the other hand, it can be easily peeled off from an adhesive resin layer without adversely affecting adhesion performance of the resin layer, because it is laminated on the layer at a peel strength of 5N/m or less, to achieve the object of the present invention.

The cellulose acetate layer can be easily laminated as a thin film of dope having a thickness of 1 to 15 μm on a polyethyleneterephthalate film by solvent casting, which can provide the high-quality surface protective film at a lower cost than dry lamination.

The starting material for forming a single-layered film of cellulose acetate by dry lamination is fragile in itself, and hence is necessarily formed into a thick film having a thickness of 100 μm or more after being incorporated with a plasticizer to reduce its fragility. The plasticizer may have adverse effects on adhesion characteristics of the object to which it is bonded and on performance of the object to which it is bonded. Moreover, a thin film having a thickness of 1 to 15 μm cannot be formed by dry lamination. Therefore, a surface protective film comprising a polyethyleneterephthalate film, adhesive agent and single-layered cellulose acetate film formed by the conventional dry lamination process cannot be used for the present invention, because it needs a high production cost and involves problems of adverse effects of the incorporated plasticizer on adhesion and semiconductor functions of the object to which it is bonded.

3. Surface Protective Film

The surface protective film of the present invention contains a cellulose-based resin layer (B) having an SP value of 21.0 to 29.0(MPa)$^{1/2}$ (the Fedors method), formed at least on one side of the base film (A). The cellulose-based resin layer (B) is preferably a cellulose acetate layer having an acetylation degree of 47 to 63, as described earlier.

The base film (A) is preferably a polyethyleneterephthalate film and laminated on the cellulose-based resin layer (B) at an adhesive strength of 200N/m or more.

The surface protective film of the present invention preferably comprises the 20 to 200 μm thick base film (A) coated, at least on one side, with the 1 to 10 μm thick, preferably 1 to 3 μm thick, cellulose-based resin layer (B) formed by spreading and drying a dope (high-viscosity solution of resin).

The organic solvent used for forming the cellulose-based resin layer (B) for the surface protective film remains at 100 ppm or less, preferably 50 ppm or less, particularly preferably 10 ppm or less. Content of the residual organic solvent of above 100 ppm is undesirable, because it may have adverse effects on adhesion characteristics of the adhesive resin layer and on performance of the object to which it is bonded.

The surface protective film of the present invention is to protect surface of the adhesive resin layer, which is bonded to an object.

The solvents useful for the present invention include acetone, methylethylketone (MEK), methylpropylketone, methylbutylketone, methylisobutylketone, methylcellosolve, ethylcellosolve, methylcellosolve acetate, ethylcellosolve acetate, dimethyl sulfoxide (DMSO), cyclopentanol, cyclohexanol, 4-methylcyclohexanol, 3,5-dimethylcyclohexanol, cyclohexanone, 1,4-dioxane, tetrahydrofuran, tetrahydropyran, diethyl ether, diisopropyl ether, dimethoxyethane, benzene, xylene, toluene, methyl chloride, ethylene chloride, formamide, acetamide, N-methylformamide, N-methylacetamide, N,N-dimethylformamide, N,N-dimethylacetamide, acetonitrile, propionitrile, benzonitrile, formic acid, acetic acid, propionic acid, maleic anhydride, acetic anhydride, methanol, ethanol, isopropyl alcohol (IPA), butanol, nitromethane, nitroethane and nitropropane. The particularly preferable solvents are methylethylketone-based mixed solvents, described below.

MEK/IPA=9/1 to 3, MEK/ethylcellosolve=9/1 to 3, MEK/ethyl acetate=9/1 to 3, MEK/cyclohexanone=9/1 to 3, and MEK/acetone=2/3.

The dope is spread by a roll coater, reverse roll coater, air knife coater, blade coater or sprayer or the like. It is preferably dried at 50 to 150° C. for 0.1 to 5 minutes.

4. Adhesive Resin

In the present invention, the adhesive resin means a composition or molded article (e.g., film or sheet) used for bonding an object. When coated with a surface protective film, it may be coated with the film on one side, or may serve as an intermediate layer for the laminate via the cellulose-based resin layer (B) put between 2 surface protective films.

The adhesive resin layer may be crosslinked (cured) or semi-crosslinked (semi-cured) beforehand. The starting material therefore is a resin composition which is not crosslinked (cured) or semi-crosslinked (semi-cured).

The resin composition may be of a non-crosslinked resin or crosslinkable resin.

4.1 Resin Composition

The resin composition for the adhesive resin for the present invention means a thermoplastic and/or thermosetting resin.

The thermoplastic resins useful for the present invention include (a) acrylic-based polymers containing a (meth)acrylic acid or its ester, e.g., homopolymers or copolymers of a (meth)acrylate ester, and copolymers of styrene/(meth)acrylate ester, vinyl acetate/(meth)acrylate ester, ethylene/(meth)acrylate ester, ethylene/(meth)acrylate, (meth)acrylate ester/(meth)acrylic acid, styrene/acrylonitrile/(meth)acrylate ester, styrene/(meth)acrylate ester/(meth)acrylic acid, styrene/acrylonitrile/(meth)acrylate ester/

(meth)acrylic acid, ethylene/vinyl acetate/(meth)acrylate ester, vinyl pyrrolidone/(meth)acrylate ester and styrene/butadiene/(meth)acrylic acid; (b) vinyl acetate-based polymers containing vinyl acetate as the monomer, e.g., vinyl acetate resin and ethylene/vinyl acetate copolymer; (c) synthetic rubbers, e.g., chloroprene rubber (CR), acrylonitrile/butadiene rubber (NBR), acrylonitrile/butadiene rubber/styrene copolymer (ABS), polybutadiene rubber (BR), hydrogenated styrene/butadiene/styrene block copolymer, styrene/ethylene-butylene/styrene resin, polyisobutylene resin (PIB), isobutylene/isoprene copolymer, butadiene rubber and styrene/isoprene copolymer; (d) natural rubber; and (e) other known thermoplastic resins, e.g., acid-modified ethylene/vinyl acetate copolymer, ionomer, polyvinyl formal (PVF), polyvinylbutyral (PVB), polyamide (PA), polyethyleneterephthalate (PET), polybutylene terephthalate (PBT), polyimide (PI), polyamideimide (PAI), polyurethane (PU) and silicone rubber.

These thermoplastic resins may have a functional group, e.g., hydrogen, alkoxy, amino, carboxyl, epoxy, hydroxyl, methylol, isocyanate, vinyl group, silanol group, hydrogen, alkoxy and an unsaturated group directly bonded to a silicon atom, which are reactive with each other or with a thermosetting resin. Thermoplastic resins can be bonded to another thermoplastic resin or to a thermosetting resin via the above functional group, to improve mechanical strength or heat resistance. These thermoplastic resins may be used either individually or in combination.

The preferable thermoplastic resins include acrylic-based polymer [e.g., (meth)acrylic-based copolymer containing a (meth)acrylate ester as the monomer], vinyl acetate-based polymer, synthetic rubber and natural rubber. Of acrylic-based polymers, particularly preferable ones are acrylic-based copolymers containing an acrylate ester (e.g., $C_2$ to $C_{10}$ alkyl ester of acrylic acid), methacrylate ester (e.g., $C_1$ to $C_4$ alkyl ester of methacrylic acid) or styrene as a comonomer, including copolymers of acrylate ester and methacrylate ester (e.g., $C_2$ to $C_{10}$ alkyl ester of acrylic acid and $C_1$ to $C_4$ alkyl ester of methacrylic acid); acrylate ester, methacrylate ester and (meth)acrylic acid (e.g., $C_2$ to $C_{10}$ alkyl ester of acrylic acid, $C_1$ to $C_4$ alkyl ester of methacrylic acid and (meth)acrylic acid); and acrylate ester, styrene and (meth)acrylic acid (e.g., $C_2$ to $C_{10}$ alkyl ester of acrylic acid, styrene and (meth)acrylic acid).

The thermosetting resins useful for the present invention include known ones, e.g., epoxy, phenol, melamine, xylene, diallyl phthalate, vinyl ester, unsaturated polyester, furan, polyurethane, maleic acid, and urea resin. Of these, epoxy and phenol resin are particularly preferable for their adhesion and electrical insulation.

Epoxy resin useful for the present invention is not limited, so long as it has at least 2 epoxy groups per molecule. These resins include diglycidyl ethers, e.g., bisphenol F, bisphenol A, bisphenol S, resorcinol, dihydroxynaphthalene, dicyclopentadiene diphenol and dicyclopentadiene dixylenol; and alicyclic epoxy compounds, e.g., epoxidized phenolic novolac, cresol novolac, trisphenylolmethane, tetraphenylolethane and meta-xylenediamine, and cyclohexane epoxide.

Moreover, halogenated epoxy resin (e.g., brominated epoxy resin) may be used for flame retardancy.

Known phenol resins are useful for the present invention, including novolac and resol types. For example, they include resins of phenol and alkyl-substituted phenols, e.g., cresol, p-t-butyl phenol, nonyl phenol and p-phenylphenol; those of cyclic, alkyl-modified phenols, e.g., terpene and dicyclopentadiene; those having a functional group containing a hetero atom, e.g., nitro, halogen, cyano and amine group; those having a structure of naphthalene, anthracene and the like, and those having a multi-functional phenol, e.g., bisphenol F, bisphenol A, bisphenol S, resorcinol and pyrogallol.

The thermosetting resin is incorporated at 5 to 400 parts by weight per 100 parts by weight of the thermoplastic resin, preferably 50 to 200 parts.

In the present invention, when an epoxy and/or phenol resin is used, a curing agent or curing promoter is preferably incorporated.

The curing agents or curing promoters useful for the present invention include known ones, such as aromatic polyamines, e.g., 3,3',5,5'-tetramethyl-4,4'-diaminodiphenylmethane, 3,3',5,5'-tetraethyl-4,4'-diaminodiphenylmethane, 3,3'-dimethyl-5,5'-diethyl-4,4'-diaminodiphenylmethane, 3,3'-dichloro-4,4'-diaminodiphenylmethane, 2,2',3,3'-tetrachloro-4,4'-diaminodiphenylmethane, 4,4'-diaminodiphenyl sulfide, 3,3'-diaminobenzophenone, 3,3'-diaminodiphenylsulfone, 4,4'-diaminodiphenylsulfone, 3,4'-diaminodiphenylsulfone, 4,4'-diaminobenzophenone and 3,4,4'-triaminodiphenylsulfone; amine complexes of boron trifluoride, e.g., boron trifluoride triethylamine complex; imidazole derivatives, e.g., 2-alkyl-4-methylimidazole and 2-phenyl-4-alkylimidazole; organic acids, e.g., anhydrous phthalic and trimellitic acid; and dicyandiamide and triphenylphosphine. They may be used either individually or in combination. The curing agent or curing promoter is incorporated preferably at 0.1 to 50 parts by weight per 100 parts by weight of the adhesive resin composition.

The adhesive resin for the present invention may be incorporated with a silicone compound containing a functional group as an adhesion promoter.

The silicone compounds useful for the present invention include vinyl triethoxysilane, vinyl tris(2-methoxyethoxy)silane, 3-glycidoxypropyltrimethoxysilane, 2-(3,4-epoxycyclohexyl)ethyltrimethoxysilane, vinyl trimethoxysilane, 3-methacryloxypropyltrimethoxysilane, 3-acryloxypropyltrimethoxysilane, 3-aminopropyltrimethoxysilane, 3-aminopropyltriethoxysilane, N-(2-aminoethyl)-3-aminopropyltrimethoxysilane, N-(2-aminoethyl)-3-aminopropylmethyldimethoxysilane, N-phenyl-3-aminopropyltrimethoxysilane, 3-mercaptopropyltrimethoxysilane and 3-chloropropyltrimethoxysilane. The adhesive resin for the present invention may be also incorporated with a tackifier, e.g., rosin, rosin ester, disproportionated rosin, hydrogenated rosin, terpene resin, styrene-modified terpene resin or phenol-modified terpene resin.

The adhesive resin may be further incorporated with one or more optional components, e.g., inorganic filler (e.g., precipitated, wet, fumed or fired silica, or titanium oxide, alumina, glass, quartz, aluminosilicate, iron oxide, zinc oxide, calcium carbonate, carbon black, silicon carbide, silicon nitride or boron nitride); the above-described inorganic filler treated with an organosilicon compound (e.g., organohalosilane, organoalkoxysilane or organosilazane); finely powdered organic resin (e.g., silicone, epoxy or fluorine resin); filler of powdered electroconductive metal (e.g., silver or copper); or dye, pigment, flame retardant, solvent, free radical generating agent, crosslinking agent or curing agent.

EXAMPLES

The surface protective film of the present invention is described in detail by EXAMPLES, which by no means limit the present invention.

The surface protective film and the laminate of the present invention were evaluated for adhesion, peel strength, adhesive strength, residual solvent and acetylation degree by the following procedures.

[Adhesion of Adhesive Resin]

Two titanium sheets (each 3 by 3 cm) were laminated one on another via an adhesive resin layer (1 by 1 cm), and thermally treated at 100° C. for 10 minutes, while they were pressed to each other at 5 kg/cm$^2$, to prepare the sample. Two aluminum sheets (each 3 by 3 cm) were laminated one on another via an adhesive resin layer (1 by 1 cm), and thermally treated at 100° C. for 10 minutes, while they were pressed to each other at 5 kg/cm$^2$, to prepare the sample. Each sample was tensile-tested in which it was subjected to a pulling stress to find cohesive failure rate (%), i.e., ratio of the cohesive-failed area of the adhesive resin layer on the sheet.

[Peel Strength of Adhesive Resin Layer from Surface Protective Film]

The laminate was cut into a 1 cm wide, 15 cm long strip, and the surface protective film on one side was pulled to 180° at a speed of 1000 mm/minute by a tensile tester. The average stress was defined as peel strength.

[Adhesive Strength of Cellulose-Based Resin Layer]

The surface protective film on which a Cellotape® was put was cut into a 2.5 cm wide, 15 cm long strip, and the Cellotape® was pulled to 180° at a speed of 1000 mm/minute by a tensile tester. The average stress was defined as adhesive strength.

[Content of Residual Solvent in Cellulose-Based Resin Layer]

The surface protective film (5 by 5 cm) contained in a 500 mL glass sample bottle was put in an oven kept at 100° C. for 60 minutes, and gas concentration in the bottle was measured by gas chromatography.

[Acetylation Degree]

Approximately 5 g of the crushed sample was dried at 100 to 105° C. for 2 hours by a drier, and then accurately weighed.

The sample was put in an Erlenmeyer flask and completely dissolved in 50 cc of purified acetone put in the flask, to which 50 cc of a 0.2N aqueous solution of NaOH and then 50 cc of 0.2N aqueous solution of HCl were added in this order. The solution was titrated with 0.2N aqueous solution of NaOH with phenolphthalein as the indicator. Acetylation degree was determined by the following formula:

Acetylation Degree (%)=$(A-B) \times F \times 1.201$/sample weight (g)

wherein,

A: Quantity of the 0.2N aqueous solution of NaOH used for titration (cc)

B: Quantity of the 0.2N aqueous solution of NaOH used for titration (cc) in the blank test F: Factor of the 0.2N aqueous solution of NaOH The materials for the surface protective films used in EXAMPLES and COMPARATIVE EXAMPLES are described.

PET Film

Teijin Du Pont Films Japan's Tetron® HS (thickness: 38 μm)

PET: polyethyleneterephthalate

PES Film

Sumitomo Bakelite's SUMILITE FS-1300 (thickness: 50 μm)

PES: polyether sulfone

Cellulose Acetate Layer

Daicel chemical's LM80 (acetylation degree: 51) and L20 (acetylation degree: 55) were dissolved in a 3/2 mixed solvent of acetone/MEK to prepare the coating solution containing nonvolatiles at 8%, which was formed into a coating film (2 μm thick on a dry basis) by a reverse roll coater.

Daicel chemical's LM35 (acetylation degree: 61) was dissolved in DMSO as a solvent to prepare the coating solution containing nonvolatiles at 8%, which was formed into a coating film (2 μm thick on a dry basis) by a reverse roll coater.

The materials for the adhesive resin composition layers used in EXAMPLES and COMPARATIVE EXAMPLES are described.

[Materials for Adhesive Resin Composition 1]

300 parts of polyamide with epoxy group at the terminal (weight-average molecular weight: 30,000), 220 parts of epoxy resin (Yuka Shell Epoxy's Epicoat® 180S65), 80 parts of novolac type phenol resin (Dainippon Ink and Chemicals), 120 parts of toluene, 120 parts of isopropyl alcohol, 3 parts of 3-glycidyloxypropyltrimethoxysilane and 10 parts of finely powdered, dry silica having a BET-determined specific surface area of 200 m$^2$/g, all parts by weight, were mixed with each other by a Ross mixer for 1 hour, and then at 170° C. for 2 hours under a vacuum. The mixture was cooled to room temperature, to prepare a semi-transparent, pasty adhesive resin composition (adhesive resin composition 1).

[Materials for Adhesive Resin Composition 2]

An EVA-based hot melt adhesive resin (Dainippon Ink and Chemicals' DX-36) was used as the adhesive resin composition 2.

[Laminate 1]

The resin composition 1 was put between the surface protective films (1), described later, to prepare the laminate, where the laminate was heated for crosslinking for 3 hours in a hot air circulation type oven kept at 80° C., for 3 hours in a hot air circulation type oven kept at 120° C. and for 3 hours in a hot air circulation type oven kept at 160° C., while it was kept 200 μm thick by 2 stainless steel rolls with an adjusted clearance, to prepare the laminate 1.

[Laminate 2]

The resin composition 2 was put between the surface protective film (2), described later, while it was molten at 140° C. and extruded, passed between 2 stainless steel rolls with an adjusted clearance, and then cooled and solidified, to prepare the laminate 2.

Example 1

Production of Surface Protective Film (1)

A dope, described below, was spread by a reverse roll coater and dried on one side of a 38 μm thick PET film (Teijin Du Pont Films Japan's Tetron® HS) to form the coating film of cellulose acetate (thickness: 2 μm on a dry basis), to prepare a surface protective film (surface protective film (1)).

Dope

Cellulose acetate (Daicel Chemical's LM80, acetylation degree: 51; SP value: 24.0(MPa)$^{1/2}$) was dissolved in a 3/2 mixture of acetone/MEK, to prepare a coating solution (dope) containing nonvolatiles at 8%.

Evaluation Results

The surface protective film (1) had a peel strength of 0.8N/m and adhesive strength of 420N/m, and contained residual solvent at 30 ppm. It showed sufficient quality as a surface protective film, no problem observed with respect to fisheye or film thickness.

Example 2
Production of Surface Protective Film (2)

A dope, described below, was spread by a reverse roll coater and dried on one side of a 38 µm thick PET film (Teijin Du Pont Films Japan's Tetron® HS) to form the coating film of cellulose acetate (thickness: 2 µm on a dry basis), to prepare the surface protective film (2).

Dope

Cellulose acetate (Daicel Chemical's L20, acetylation degree: 55; SP value: $22.7(MPa)^{1/2}$) was dissolved in a 3/2 mixture of acetone/MEK, to prepare a coating solution (dope) containing nonvolatiles at 8%.

Evaluation Results

The surface protective film (2) had a peel strength of 0.9N/m and adhesive strength of 420N/m, and contained residual solvent at 30 ppm. It showed sufficient quality as a surface protective film, no problem observed with respect to fisheye or film thickness.

Comparative Example 1
Preparation of Surface Protective Film (3)

A 38 µm thick PET film (Teijin Du Pont Films Japan's Tetron® HS) was prepared as the surface protective film (3).

This film was not coated with a cellulose acetate film.

Evaluation Results

The surface protective film (3) showed insufficient quality as a surface protective film, because it was bonded to the adhesive resin composition layer at too high a peel strength to be peeled off therefrom smoothly.

Comparative Example 2
Preparation of Surface Protective Film (4)

A PES film (Sumitomo Bakelite's SUMILITE FS-1300 (thickness: 50 µm) was prepared as the surface protective film (4).

This film was not coated with a cellulose acetate film.

Evaluation Results

The surface protective film (4) showed no problem with respect to peel strength, because it was 1.0N/m at which it was bonded to the adhesive resin composition layer. However, the PES film showed insufficient quality as a surface protective film, because of fisheye observed on the surface, uneven film thickness and defective ratio of around 30%.

Comparative Example 3
Production of Surface Protective Film (5)

A dope, described below, was spread by a reverse roll coater and dried on one side of a 38 µm thick PET film (Teijin Du Pont Films Japan's Tetron® HS) to form the coating film of cellulose acetate (thickness: 2 µm on a dry basis), to prepare the surface protective film (5).

Dope

Cellulose acetate (Daicel Chemical's LM35, acetylation degree: 61; SP value: $20.9(MPa)^{1/2}$) was dissolved in DMSO as a solvent, to prepare a coating solution (dope) containing nonvolatiles at 8%.

Evaluation Results

The surface protective film (5) showed no problem with respect to fisheye or film thickness. However, it showed insufficient quality as a surface protective film, because of high residual solvent content of 6,000 ppm.

Evaluation of the Adhesive Resin Layer 1

The laminate 1 was slit into a tape.

The tape of the laminate 1 was bonded to a titanium and aluminum foil.

More specifically, it was put between a titanium and aluminum foil, after the surface protective film on the tape was removed, and thermally treated at 100° C. for about 1 hour to be bonded to these foils.

Evaluation Results

The surface protective film on the laminate 1 could be easily peeled off from the adhesive resin composition layer 1, leaving the flat surface of the adhesive resin composition layer 1 while showing no substance transferred from the layer 1, and had good adhesion to the titanium and aluminum foil, 105 and 103% at cohesive failure rate, respectively. Therefore, a titanium foil/aluminum foil laminate of good quality could be produced, from which it was judged that the laminate 1 had sufficient quality.

Evaluation of the Adhesive Resin Layer 2

The laminate 2 was slit into a tape.

The tape of the laminate 2 was bonded to an aluminum and stainless steel foil.

More specifically, it was put between an aluminum and stainless steel foil, after the surface protective film of the tape was removed, and thermally treated at 100° C. for about 1 hour to be bonded to these foils.

Evaluation Results

The surface protective film on the laminate 2 could be easily peeled off from the adhesive resin composition layer 2, leaving the flat surface of the adhesive resin composition layer 2 while showing no substance transferred from the layer 2, and had good adhesion to the aluminum and stainless steel foil, 103 and 101% at cohesive failure rate, respectively. Therefore, an aluminum foil/stainless steel foil laminate of good quality could be produced, from which it was judged that the laminate 2 had sufficient quality.

The surface protective film of the present invention has advantages that it can be easily peeled off from an adhesive resin layer, is free of a plasticizer or the like which may have an adverse effect on adhesion of the adhesive resin layer to an object to which the adhesive resin layer is bonded, and has no adverse effect on thickness uniformity or surface flatness of the adhesive resin layer.

What is claimed is:

1. A surface protective film for adhesive resin, comprising a base film (A) coated, at least on one side, with a cellulose-based resin layer (B) having an SP value of 21.0 to 29.0 $(MPa)^{1/2}$, determined by the Fedors method.

2. The surface protective film according to claim 1, wherein said cellulose-based resin layer (B) is of cellulose acetate having an acetylation degree of 47 to 63.

3. The surface protective film according to claim 1, wherein said base film (A) is a polyethyleneterephthalate film, and said base film (A) and cellulose-based resin layer (B) are laminated at an adhesive strength of 200N/m or more.

4. The surface protective film according to claim 1, wherein said cellulose-based resin layer (B) contains a residual organic solvent at 100 ppm or less.

5. The surface protective film according to claim 1, wherein said base film (A) is 20 to 200 µm thick and cellulose-based resin layer (B) is 1 to 10 µm thick.

6. The surface protective film according to claim 1, wherein the surface protective film and resin surface to which it is applied are bonded to each other at a peel strength of 5N/m or less.

7. A process for producing the surface protective film for adhesive resin, comprising a base film (A) coated, at least on one side, with a cellulose-based resin layer (B) having an SP value of 21.0 to $29.0(MPa)^{1/2}$, determined by the Fedors method, wherein a dope of cellulose-based resin is spread and dried at least on one side of said base film (A) to form said cellulose-based resin layer (B) thereon.

* * * * *